United States Patent
Merrill et al.

(10) Patent No.: US 6,476,372 B2
(45) Date of Patent: *Nov. 5, 2002

(54) CMOS ACTIVE PIXEL SENSOR USING NATIVE TRANSISTORS

(75) Inventors: Richard B. Merrill, Woodside; Tsung-Wen Lee, Milpitas, both of CA (US)

(73) Assignee: Foveon, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/813,486

(22) Filed: Mar. 20, 2001

(65) Prior Publication Data

US 2001/0010353 A1 Aug. 2, 2001

Related U.S. Application Data

(63) Continuation of application No. 09/137,664, filed on Aug. 20, 1998, now Pat. No. 6,242,728.

(51) Int. Cl.[7] .............................................. H01L 27/00
(52) U.S. Cl. .................................. 250/208.1; 250/214 R
(58) Field of Search .......................... 250/208.1, 214 R, 250/214.1, 214 LS; 257/290–296, 446; 348/302, 308, 297, 294

(56) References Cited

U.S. PATENT DOCUMENTS

| | | | |
|---|---|---|---|
| 5,831,258 A | 11/1998 | Street | 250/208.1 |
| 5,850,093 A | 12/1998 | Tarng et al. | 257/327 |
| 5,892,253 A | 4/1999 | Merrill | 257/292 |
| 5,933,190 A | * 8/1999 | Dierickx et al. | 348/302 |
| 5,952,686 A | 9/1999 | Chou | 257/292 |

* cited by examiner

*Primary Examiner*—Que T. Le
(74) *Attorney, Agent, or Firm*—Skjerven Morrill LLP

(57) ABSTRACT

An active pixel sensor including low threshold voltage transistors advantageously provides an increased output swing over an active pixel sensor of the prior art. The low threshold voltage transistor can be achieved using either a native transistor or a depletion mode transistor. In a process in which a threshold adjustment implant step is separately masked, the active pixel sensor of the present invention can be manufactured with no additional masking requirements. In one embodiment, a low threshold voltage ($V_{TN}$) allows a transistor acting as a reset switch to operate in the linear region, and allowing the reset switch transistor to share a common supply voltage source with a readout amplifier transistor.

4 Claims, 2 Drawing Sheets

CMOS ACTIVE PIXEL SENSOR USING NATIVE TRANSISTORS

RELATED APPLICATION

This application is a continuation of application Ser. No. 09/137,664 filed Aug. 20, 1998, now U.S. Pat. No. 6,242,728 issued on Jun. 5, 2001.

BACKGROUND OF THE INVENTION

1. Field of the Invention

The present invention relates to active pixel sensors. In particular, the present invention relates to active pixel sensors manufactured under a complementary metal-oxide-silicon (CMOS) process.

2. Discussion of the Related Art

Active pixel sensors (APS) are used in imaging applications, such as digital cameras. APS are described, for example, in the articles: (a) "256×256 CMOS Active Pixel Sensor Camera-on-a-Chip" by Nixon et al., IEEE International Solid-State Conference (ISSCC96), pp.178–179, and (b) "Current-Mediated, Current-Reset 768×512 Active Pixel Sensor Array" by R. D. McGrath et al., IEEE International Solid-State Conference (ISSCC96), pp.182–183.

These articles describe APS arrays and associated digital logic circuits which are integrated into integrated circuits. Logic circuits integrated with APS arrays are, for example, circuits for performing the timing and control functions of a "camera-on-a-chip". Typically, a conventional CMOS process is used to manufacture such an integrated circuit, since both the logic circuits and the APS array can be formed using CMOS transistors and diodes of such a conventional process. A typical APS 100, which is the building block of an APS array, is shown in FIG. 1.

As shown in FIG. 1, APS 100 includes transistors 101, 102 and 103, and a photodiode 104. An on-chip current source 105 allows the state of the APS to be read out. The drain and source terminals of transistor 101 are respectively coupled to a reference supply ($V_{ref}$) 106 and a cathode (107) of photodiode 104, whose anode is coupled to a ground or fixed reference voltage ($V_{ss}$). The source terminal of transistor 101 drives the gate terminal of transistor 102, whose drain and source terminals are coupled respectively to a power supply ($V_{cc}$) 109 and drain terminal 108 of transistor 103. Reference supply ($V_{ref}$) 106 can be, but need not be, power supply ($V_{cc}$) 109. The source terminal of transistor 103 is coupled to current source 105. During operation, a high reset voltage is initially provided at transistor 101 to pull node 107 up to a dark reference voltage ($V_{reset}$). If the active reset voltage is high enough to keep transistor 101 in the linear region, dark reference voltage $V_{reset}$ equals $V_{ref}$. Keeping transistor 101 in the linear region is desired because the dark reference voltage $V_{reset}$ is then immune from noise in the threshold voltage ($V_T$) of transistor 101. When the reset voltage is turned off, the charge trapped at photodiode 104's cathode (i.e., node 107) maintains a high voltage there. When APS 100 is exposed to light, photodiode 104 discharges node 107 to bring the voltage at node 107 towards the ground reference voltage. The voltage at node 107 can be read by turning on transistor 103, by applying a selection voltage at the gate terminal of transistor 103, and sensing the output voltage $V_{out}$ at terminal 120. For an undischarged pixel, voltage $V_{out}$ is given by:

$$V_{out} = V_{reset} - V_{noise} - V_T$$

where $V_{reset}$ is the dark reference voltage at node 107, $V_{noise}$ represents a reset noise, and $V_T$ is the threshold voltage for transistor 102. Because of the functions they perform, transistors 101 and 102 are often referred to as a "reset switch" and a "read-out amplifier," respectively.

As discussed above, if transistor 101 is a typical CMOS transistor, transistor 101 can operate in the linear region, so that $V_{reset}$ can be made very close to reference supply voltage $V_{ref}$. In a transistor typically used in a CMOS logic circuit, the threshold voltage $V_T$ is approximately 0.8 volts. Such a threshold voltage is typically set by a P-type "$V_t$ adjustment" implant into the channel region. With a 3.3 volts back-bias (i.e., a source terminal voltage of 3.3 volts relative to the substrate), $V_T$ can be in excess of 1 volt. Consequently, $V_{out}$ has an output swing of less than 2 volts between the undischarged state and the discharged state of APS 100, as shown in the oscilloscope trace in FIG. 2. If the reset voltage at the gate terminal of transistor 101 is set to $V_{ref}$, $V_{reset}$ is approximately $V_{ref} - V_T$, the output swing is even less. Thus, the active pixel sensor of the prior art has poor performance under low power supply conditions.

SUMMARY OF THE INVENTION

The present invention provides an active pixel sensor (APS) with an increased output swing, using transistors of low threshold voltages.

In one embodiment, native transistors with a threshold voltage of approximately zero volts are provided in an APS of the present invention to achieve a 35% increase in output swing. Alternatively, depletion mode transistors can be used to achieve even higher increased output swing.

In one embodiment, a native transistor can be achieved by protecting the channel region during a threshold voltage ($V_T$) adjustment implant step. In that embodiment, since the threshold voltage adjustment implant step is separately masked, no additional masking step is required to achieve the APSs of the present invention.

The present invention is better understood upon consideration of the detailed description below and the accompanying drawings.

DETAILED DESCRIPTION OF THE PREFERRED EMBODIMENTS

The present invention uses low $V_t$ CMOS transistors (e.g., native transistors) in an active pixel sensor (APS) circuit. Native transistors, which are also known as W-FET or W-channel transistor ("W" for "without implant") can be manufactured in a conventional CMOS process, for example, by protecting the channel region of such transistors from a threshold adjustment implant. In one process, the N-channel of a NMOS transistor is provided a P-type $V_t$ adjustment implant. To create a native transistor in such a process, the channel regions of the native transistors are blocked or masked during this implant step. In one embodiment, such a native CMOS transistor has a threshold voltage ($V_{TN}$) close to zero volts. In many CMOS processes, especially those designed for 0.5 μm feature sizes or less, the threshold adjustment implant step is separately masked, so that the circuit designer can specify the native transistors for free, i.e., without requiring an additional masking layer.

Figure 1:
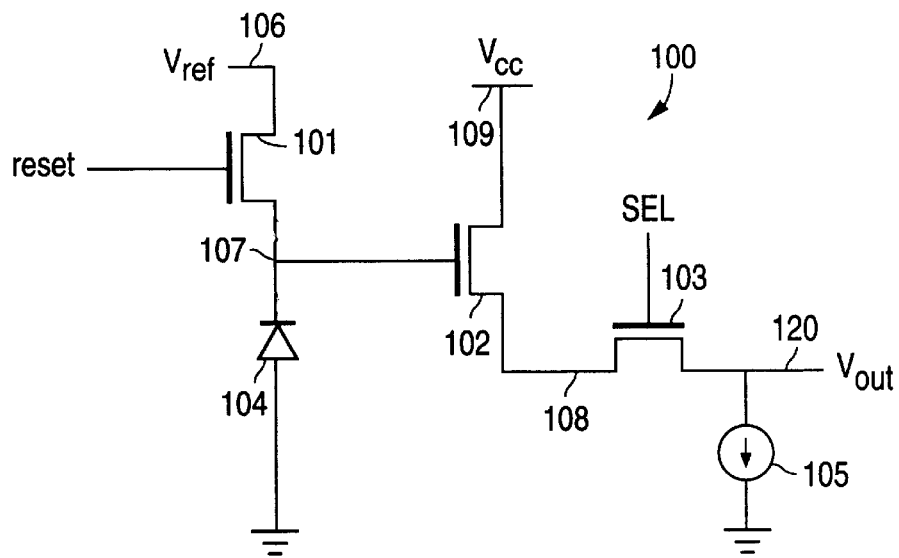
FIG. 1 shows a 3-transistor active pixel sensor (APS) 100 of the prior art.
Figure 2:
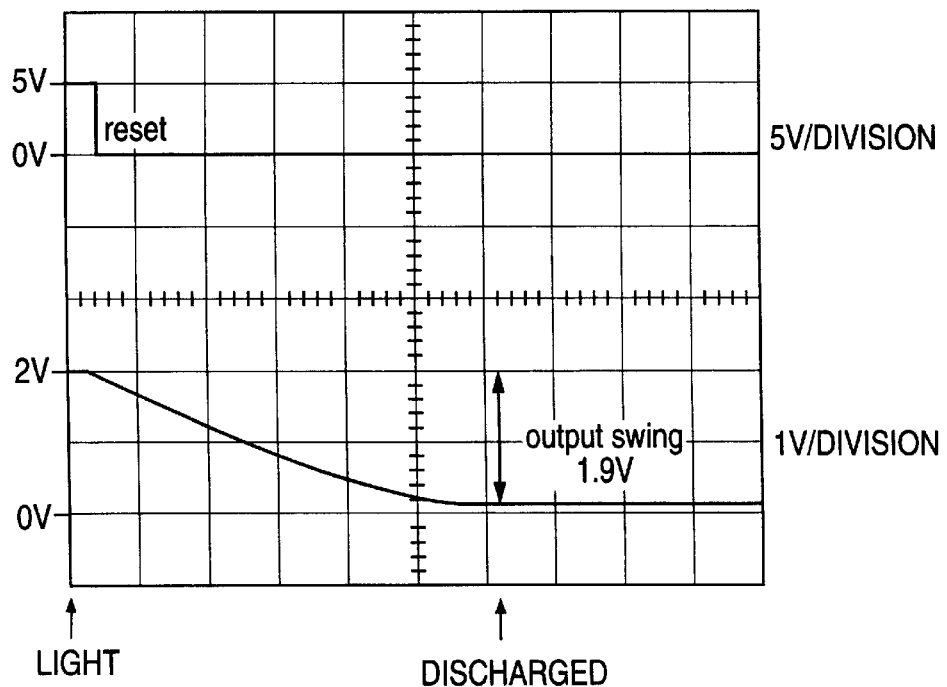
FIG. 2 shows an output range of approximately 2 volts between the undischarged state and the discharged state of APS 100.
Figure 3:
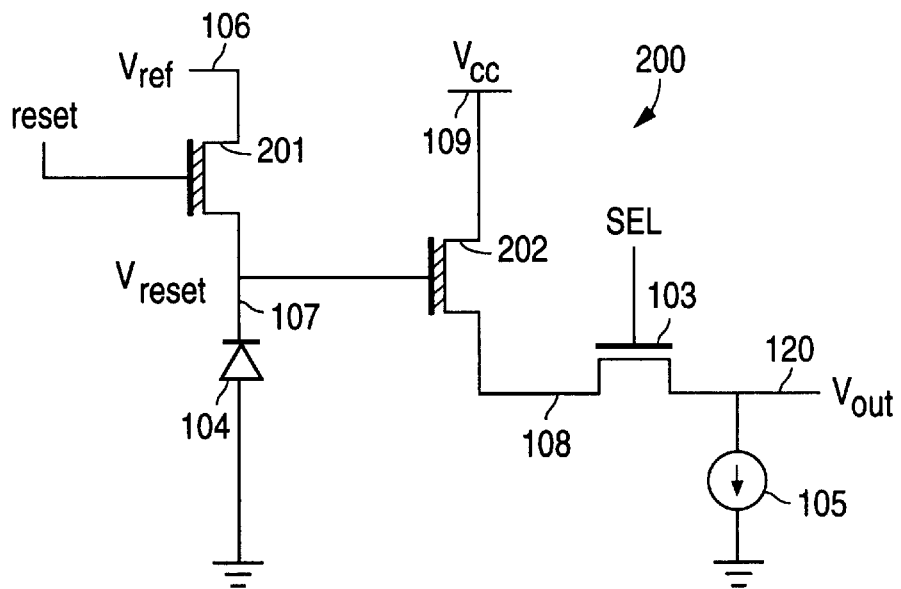
FIG. 3 shows a 3-transistor APS 200, in accordance with the present invention.

Thus, in accordance with the present invention, an APS 200 is provided in FIG. 3. To facilitate comparisons between FIGS. 1 and 3, like elements are provided like reference numerals. As shown in FIG. 3, APS 200 includes transistors 201, 202 and 103, and a photodiode 104. A current source 105 is provided to facilitate reading of APS 200. The drain and source terminals of transistor 201 are respectively coupled to reference supply ($V_{ref}$) 106 and a cathode (107) of photodiode 104, whose anode is coupled to a ground or fixed reference voltage ($V_{ss}$) source. The source terminal of transistor 201 drives the gate terminal of transistor 202, whose drain and source terminals are coupled respectively to a power supply ($V_{cc}$) 109 and drain terminal 108 of transistor 103. The source terminal of transistor 103 is coupled to current source 105. Reference supply ($V_{ref}$) can be, but need not be, power supply $V_{cc}$. During operation, a high reset voltage is initially provided at transistor 201 to pull node 107 to a dark reference voltage. The reset voltage can be made equal to or greater than the voltage $V_{ref}$ at reference supply 106. When the reset voltage is turned off, the charge trapped at photodiode 104's cathode 107 maintains a high voltage there. When APS 200 is exposed to light, photodiode 104 discharges node 107 to bring the voltage at node 107 towards the fixed or ground reference voltage $V_{ss}$. The voltage at node 107 can be read by turning on transistor 103, by asserting a selection signal "sel" at the gate terminal of transistor 103, and sensing the output voltage $V_{out}$ at terminal 120. For an undischarged pixel, voltage $V_{out}$ is given by:

$$V_{out} = V_{reset} - V_{noise} - V_{TN}$$

where $V_{reset}$ is the dark reference voltage at node 107, $V_{noise}$ represents a reset noise, and $V_{TN}$ is the threshold voltage for transistor 202. As in the prior art, transistor 201 can operate in the linear region, so that $V_{reset}$ can be made very close to reference supply voltage $V_{ref}$.

Figure 4:
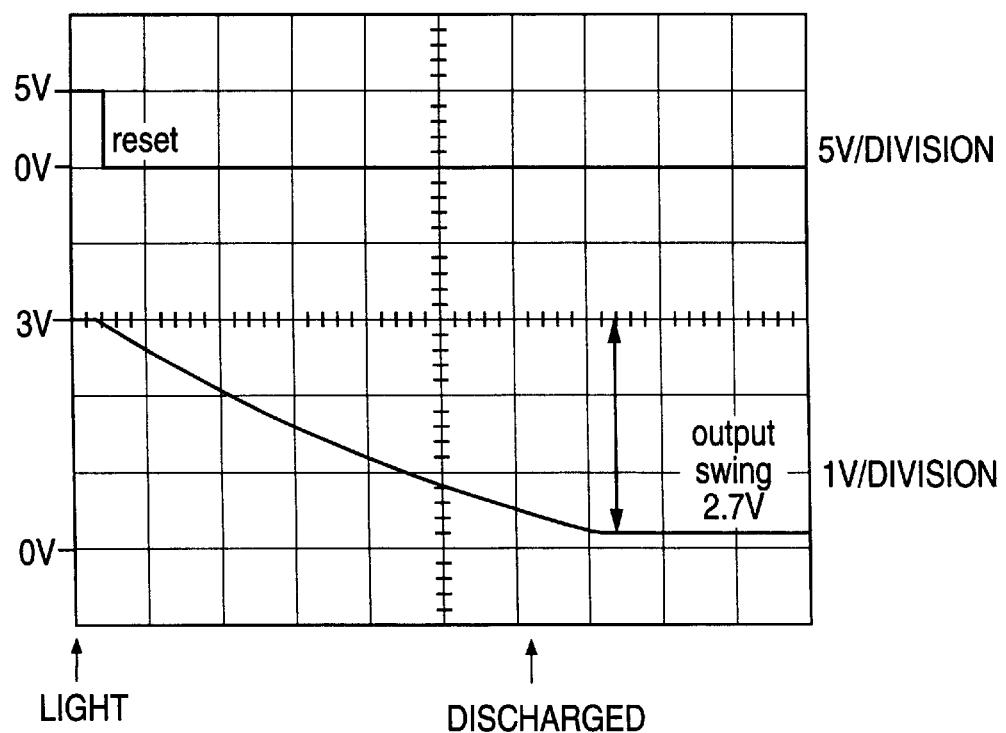
FIG. 4 shows an output range of approximately 2.7 volts between the undischarged state and the discharged state of APS 200.

Unlike the 0.8 volts threshold voltage of a typical CMOS transistor used in logic circuits, the threshold voltage $V_{TN}$ for a native transistor is approximately 0 volts. Thus, as shown in FIG. 4, the output swing of approximately 2.7 volts between the undischarged state and the discharged state of APS 200 can be achieved. Alternatively, if the reset voltage at the gate terminal of transistor 201 is set to $V_{ref}$, $V_{reset}$ is approximately $V_{ref} - V_{TN}$. Consequently, the increased output swing of APS 200 over the prior art using non-native transistors connected in the same configuration is $2V_{TN}$, or approximately 1.6 volts. Of course, a portion of this increased output swing can be achieved even when the threshold voltage ($V_{TN}$) of only one of transistors 201 and 202 is reduced.

Further, when transistor 201 is a native transistor, the logic high voltage of the reset signal at the gate terminal of transistor 201 need not be as high as the corresponding logic high voltage of the prior art reset signal at the gate terminal of transistor 101 to bring voltage $V_{reset}$ to reference supply voltage $V_{ref}$. Bringing voltage $V_{reset}$ to $V_{ref}$ is desirable for noise immunity reasons. Alternatively, a lower threshold voltage (i.e., $V_{TN}$) reduces the difference between reference supply $V_{ref}$ and $V_{reset}$ at a lower logic high voltage of the reset signal. For a fixed logic high voltage of the reset signal, and the requirement that $V_{reset}$ be brought to reference supply $V_{ref}$, a lower threshold voltage $V_{TN}$ in transistor 201 allows a higher $V_{ref}$ voltage to be used. For example, threshold voltage $V_{TN}$ can allow reference supply $V_{ref}$ to be as high as $V_{cc}$, thereby allowing the same supply grid to be shared by reference supply $V_{ref}$ and power supply $V_{cc}$.

Alternatively, depletion mode transistors having threshold voltages of less than zero volts can be used to implement transistors 201 and 202 to provide even larger increased output swing. However, as the threshold voltage of transistor 201 is made more negative, the operating range is limited at the low-end by leakage current in transistor 201. Therefore, the threshold voltage of transistor 201 is preferably not more negative than about −0.5 volts.

The above detailed description is provided to illustrate the specific embodiments of the present invention and is not intended to be limiting. Numerous variations and modifications within the scope of the present invention are possible. For example, although the present invention is illustrated using NMOS transistors, one skilled in the art would appreciate, upon consideration of the disclosure herein, that PMOS transistors can also be used to provide the active pixel circuits of the present invention. The present invention is set forth in the following claims.

We claim:

1. An active pixel sensor (APS) comprising:
   a first transistor having a gate terminal, a drain terminal, and a source terminal, said drain terminal of said first transistor coupled to a first reference voltage source and said gate terminal of said first transistor coupled to receive a reset signal;
   a photodiode coupled between said source terminal of said first transistor and a second reference voltage source; and
   a second transistor having a gate terminal, a drain terminal, and a source terminal, said gate terminal of said second transistor coupled to said source terminal of said first transistor, and said drain terminal of said second transistor coupled to a drain voltage supply, wherein said first and second transistors are native transistors formed in a CMOS process.

2. The APS of claim 1 in which said first and second transistors are N-type transistors formed in a P-type semiconductor substrate and said first and second transistors each have a threshold voltage between −0.5 Volts and +0.2 Volts.

3. The APS of claim 1 integrated on a semiconductor substrate that includes a plurality of enhancement-mode N-type transistors formed in P-type doped regions, in which said first and second transistors are N-type transistors formed in a semiconductor region that has a P-type dopant density less than a dopant density of said P-type doped regions.

4. An active pixel sensor (APS) comprising:
   a photodiode; and
   a plurality of transistors each having a gate terminal, a drain terminal, and a source terminal, said plurality of transistors configured to be able to reset said APS and to read out a signal representative of an integrated amount of light falling on said APS,
   wherein a first one of said plurality of transistors is an enhancement-mode N-type transistor formed in a first P-type doped region; and
   wherein a second one of said plurality of transistors is a native transistor formed in a second P-type doped region that has a dopant density less than a dopant density in said first P-type doped region, such that said second transistor has a threshold voltage closer to zero than to a threshold voltage of said first transistor.

\* \* \* \* \*